US012681880B2

(12) United States Patent
Maniloff et al.

(10) Patent No.: US 12,681,880 B2
(45) Date of Patent: Jul. 14, 2026

(54) REMAPPING REFERENCE CODES IN PLUGGABLE MODULES TO SUPPORT DIFFERENT APPLICATIONS

(71) Applicant: Ciena Corporation, Hanover, MD (US)

(72) Inventors: Eric Maniloff, Woodlawn (CA); Munjeen Khan, Ottawa (CA); Rahim Amarsi, Ottawa (CA); Martin Bluethner, Ottawa (CA); Ian Alderdice, Ottawa (CA); Avid Lemus, San Francisco, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/905,510

(22) Filed: Oct. 3, 2024

(65) Prior Publication Data

US 2026/0099453 A1 Apr. 9, 2026

(51) Int. Cl.
| | |
|---|---|
| *G06F 13/38* | (2006.01) |
| *G06F 13/40* | (2006.01) |
| *G06F 13/42* | (2006.01) |

(52) U.S. Cl.
CPC .......... *G06F 13/387* (2013.01); *G06F 13/409* (2013.01); *G06F 13/4282* (2013.01)

(58) Field of Classification Search
CPC . G06F 13/387; G06F 13/4009; G06F 13/4282
See application file for complete search history.

(56) References Cited

U.S. PATENT DOCUMENTS

| | | | |
|---|---|---|---|
| 6,111,676 | A | 8/2000 | Lemus et al. |
| 6,313,771 | B1 | 11/2001 | Munroe et al. |
| 6,323,978 | B1 | 11/2001 | Harley et al. |
| 6,594,421 | B1 | 7/2003 | Johnson et al. |
| 6,687,426 | B1 | 2/2004 | May et al. |
| 6,778,102 | B1 | 8/2004 | Grunnet-Jepsen et al. |
| 6,865,344 | B1 | 3/2005 | Johnson et al. |
| 7,065,298 | B1 | 6/2006 | Munroe et al. |
| 7,088,436 | B2 | 8/2006 | Lemus-Tejada et al. |
| 7,242,862 | B2 | 7/2007 | Saunders et al. |
| 7,257,120 | B2 | 8/2007 | Saunders et al. |
| 9,793,984 | B2 | 10/2017 | Sinclair et al. |

(Continued)

OTHER PUBLICATIONS

Optical Internetworking Forum (OIF) Implementation Agreement (IA), Common Management Interface Specification (CMIS), Revision 5.2, OIF-CMIS-05.2, Apr. 27, 2022.
Storage Networking Industry Association (SNIA), Small Form-Factor (SFF) Specification SFF-8024, SFF Module Management Reference Code Tables, Rev. 4.12, Jul. 9, 2024.
QSFP-DD MSA, QSFP-DD/QSFP-DD800/QSFP-DD1600 Hardware Specification for QSFP Double Density 8X Pluggable Transceivers, Revision 7.1, Jun. 25, 2024.

(Continued)

*Primary Examiner* — Zachary K Huson
(74) *Attorney, Agent, or Firm* — Baratta Law PLLC; Lawrence A. Baratta, Jr.

(57) ABSTRACT

A pluggable module includes a media interface including a receiver and a transmitter, wherein the media interface is configured to operate a media interface mode defined by a code; circuitry communicatively coupled to the media interface; and an electrical interface communicatively coupled to the circuitry and to a host device housing the pluggable module; wherein the circuitry stores a remapping table used to convert the code exchanged between the host device and the pluggable module. This enables a host device to operate the pluggable module in media interface modes that are unsupported by the host device, e.g., vendor-specific codes for custom applications.

19 Claims, 2 Drawing Sheets

(56)　　　　　　　References Cited

U.S. PATENT DOCUMENTS

| | | | |
|---|---|---|---|
| 10,382,167 | B2 | 8/2019 | Gareau et al. |
| 10,396,891 | B2 | 8/2019 | Maniloff et al. |
| 10,637,604 | B2 | 4/2020 | Gareau et al. |
| 10,749,602 | B2 | 8/2020 | Charlton et al. |
| 10,877,230 | B1 | 12/2020 | Mack et al. |
| 10,979,139 | B1 | 4/2021 | Ibach et al. |
| 10,979,270 | B2 | 4/2021 | Sun et al. |
| 11,082,367 | B2 | 8/2021 | Maniloff et al. |
| 11,695,472 | B2 | 7/2023 | Ibach et al. |
| 11,742,951 | B1 * | 8/2023 | Bhiday .................... H04B 1/40 |
| | | | 398/135 |
| 2004/0085651 | A1 | 5/2004 | Lomas et al. |
| 2004/0130751 | A1 | 7/2004 | Hirtenreiter et al. |
| 2018/0159620 | A1 | 6/2018 | Prescott et al. |

OTHER PUBLICATIONS

OSFP MSA, OSFP Octal Small Form Factor Pluggable Module, Rev 5.0, Oct. 2, 2022.

CFP MSA Management Interface Specification Mar. 24, 2017 Version 2.6 r06a.

OIF IA, Implementation Agreement for CFP2-Digital Coherent Optics Module, IA # OIF-CFP2-DCO-01.0, Oct. 17, 2018.

Storage Networking Industry Association (SNIA), SFF-8636, Specification for Management Interface for 4-lane Modules, Revision 2.11, Jan. 3, 2023.

CFP MSA Hardware Specification, Rev. 1.4, published by the CFP MSA organization, Jun. 7, 2010.

Jan. 13, 2026, International Search Report and Written Opinion for International Patent Application No. PCT/US2025/048402.

* cited by examiner

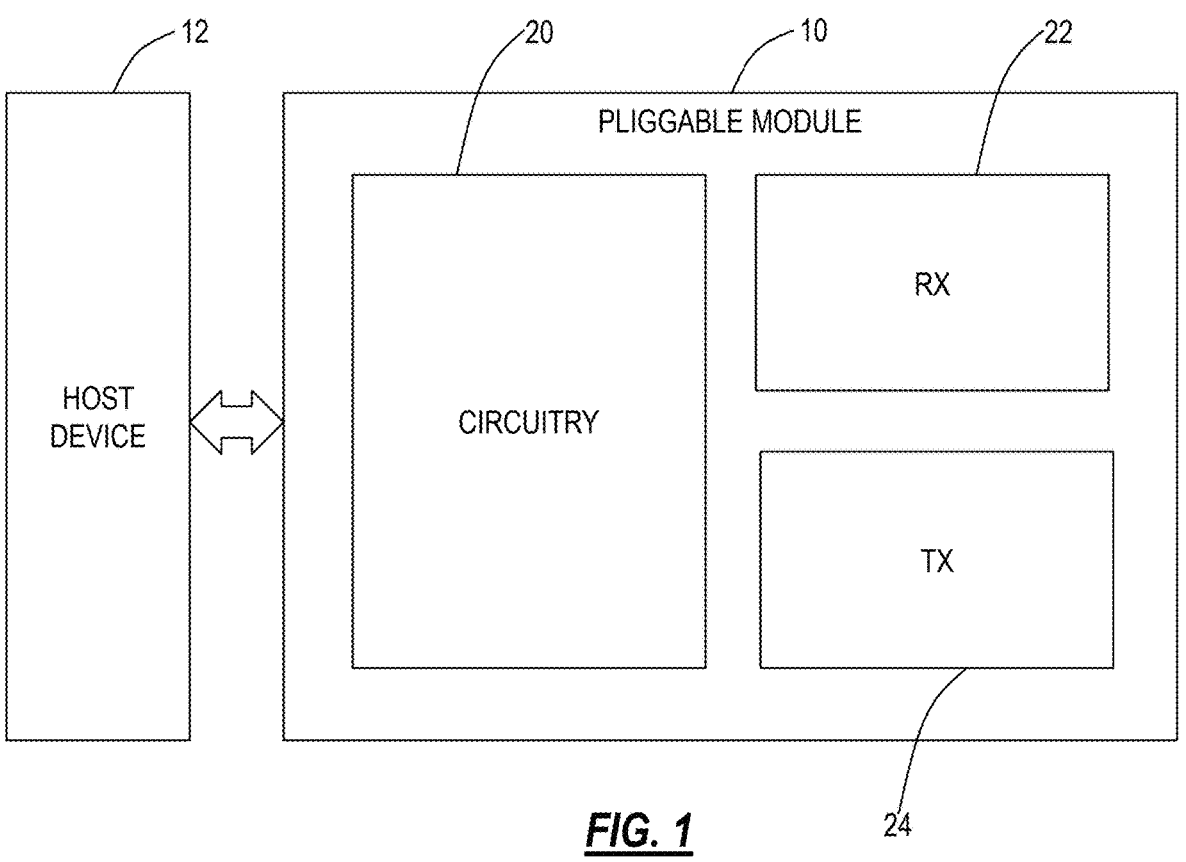
_FIG. 1_
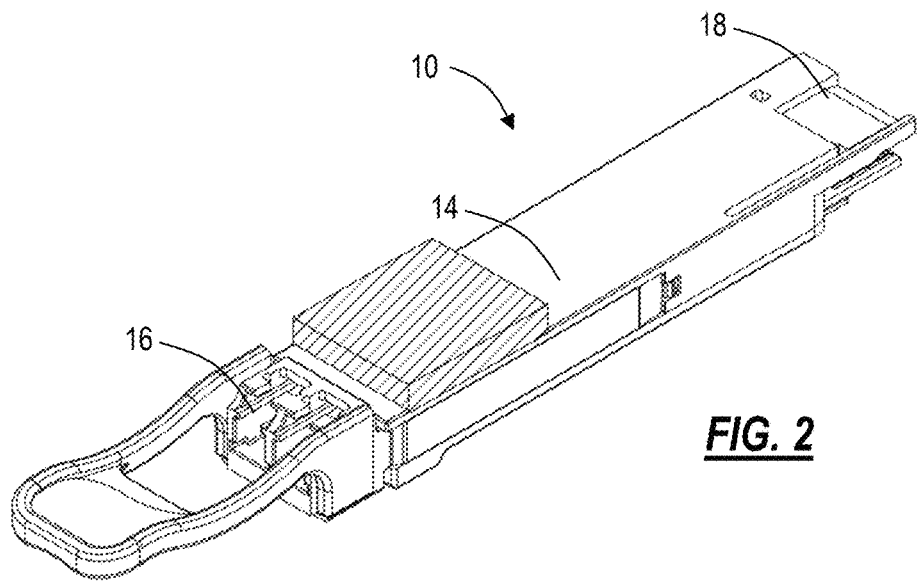
_FIG. 2_

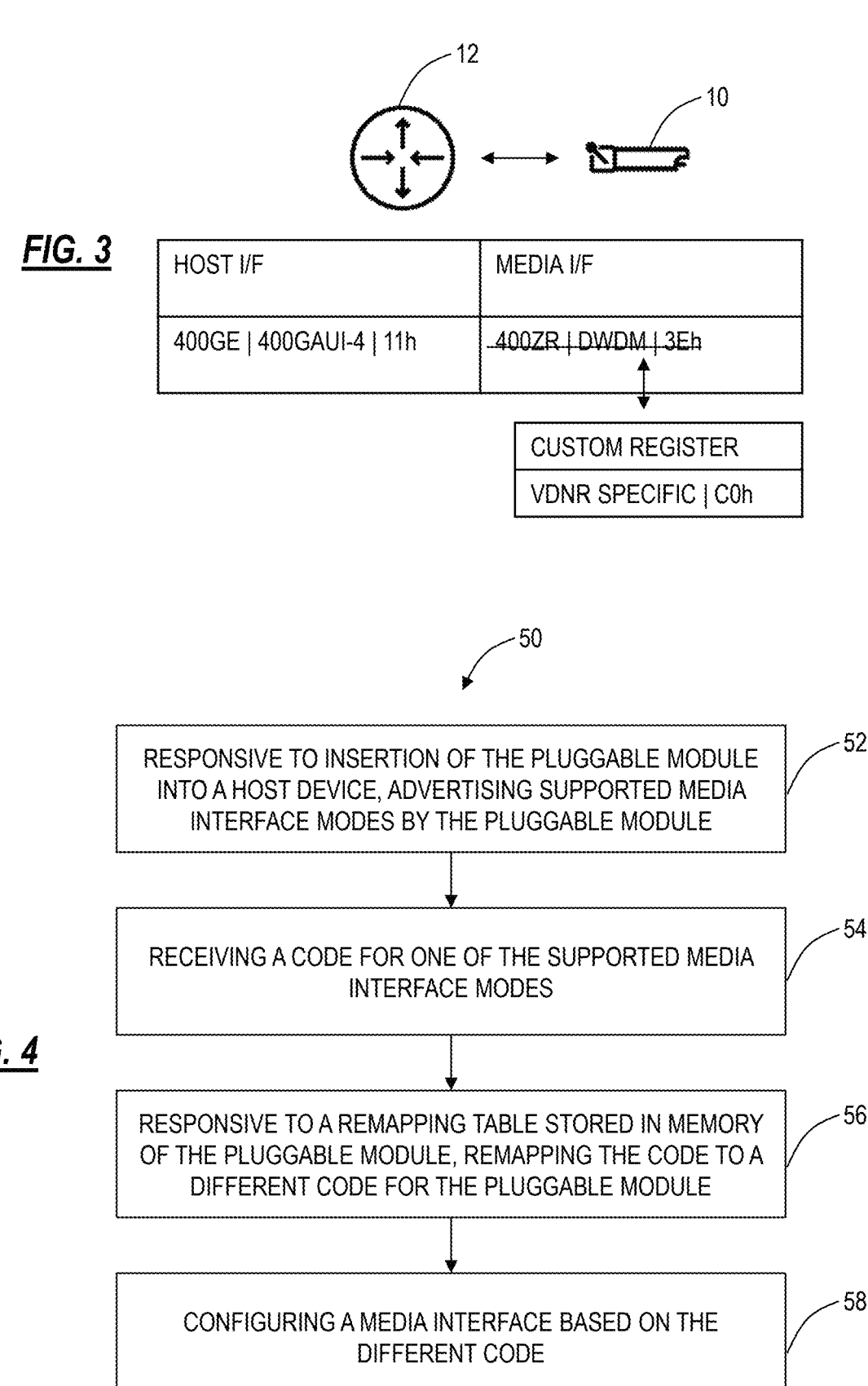

*FIG. 3*

| HOST I/F | MEDIA I/F |
|----------|-----------|
| 400GE | 400GAUI-4 | 11h | ~~400ZR | DWDM | 3Eh~~ |

CUSTOM REGISTER

VDNR SPECIFIC | C0h

52 — RESPONSIVE TO INSERTION OF THE PLUGGABLE MODULE INTO A HOST DEVICE, ADVERTISING SUPPORTED MEDIA INTERFACE MODES BY THE PLUGGABLE MODULE

54 — RECEIVING A CODE FOR ONE OF THE SUPPORTED MEDIA INTERFACE MODES

56 — RESPONSIVE TO A REMAPPING TABLE STORED IN MEMORY OF THE PLUGGABLE MODULE, REMAPPING THE CODE TO A DIFFERENT CODE FOR THE PLUGGABLE MODULE

58 — CONFIGURING A MEDIA INTERFACE BASED ON THE DIFFERENT CODE

REMAPPING REFERENCE CODES IN PLUGGABLE MODULES TO SUPPORT DIFFERENT APPLICATIONS

FIELD OF THE DISCLOSURE

The present disclosure relates generally to networking. More particularly, the present disclosure relates to systems and methods for remapping reference codes in pluggable modules to support different applications.

BACKGROUND OF THE DISCLOSURE

Pluggable modules in optical networks are interchangeable hardware components that can be selectively inserted into or removed from host devices like routers, switches, compute, storage, and the like. These modules, such as Small Form-Factor Pluggable (SFP), Quad Small Form-Factor Pluggable (QSFP), C Form-Factor Pluggable (CFP), Octal Small Form-Factor Pluggable (OSFP), including variants thereof, and the like, enable the flexible deployment of various optical interfaces to meet different network requirements. Advantageously, pluggable modules provide simplified network upgrades, as they allow for the easy replacement or addition of new capabilities without the need to replace entire systems. They also support scalability, as network operators can incrementally increase capacity by adding more modules as needed. Additionally, pluggable modules enhance cost efficiency by allowing tailored deployments that match specific needs, reducing the need for over-provisioning. The interoperability across different vendors and products further promotes a more flexible and adaptable network infrastructure.

Common Management Interface Specification (CMIS) is a standardized interface that facilitates communication between host systems and pluggable modules, ensuring interoperability across different vendors and platforms. It enables consistent management and control of these modules, covering functions like initialization, configuration, status monitoring, and performance tracking. Reference codes within CMIS are used to identify specific operational states. This standardization simplifies the integration of pluggable modules into network equipment, enhancing reliability and streamlining network management. The reference codes include Vendor Specific/Custom codes which can be used to add advanced functionality, such as the proprietary or pre-standard media interface identifiers. However, some host devices may not support these Vendor Specific/Custom codes as well as not support newer identifiers and pre-standard identifiers.

BRIEF SUMMARY OF THE DISCLOSURE

The present disclosure relates to systems and methods for remapping reference codes in pluggable modules to support different applications. Specifically, the present disclosure describes approaches to use custom applications in host devices that do not have knowledge of the custom applications, i.e., an ability to support Vendor Specific/Custom codes. This includes remapping an advertised code to a different code, e.g., a standard 400ZR DWDM code of 3Eh remapped to a custom code, e.g., C1h, C2h, etc. With this, new standard and custom media modes can be used in existing host devices without requiring changes or updates to the host device, such as to its software, firmware, etc. The codes can be exchanged via Inter-Integrated Circuit (I2C) and involves programming the pluggable module to either accept a given code or to remap the given code to another code via a remapping table. This programming is not restricted to manufacturing and can be performed in the field as well. Advantageously, this approach allows new, advanced, proprietary transmission modes with pluggable modules, without requiring explicit support by the host devices, providing faster delivery. The remapping table can be configured in any host platforms with direct I2C connectivity to the pluggable module.

In an embodiment, a pluggable module includes a media interface including a receiver and a transmitter, wherein the media interface is configured to operate a media interface mode defined by a code; circuitry communicatively coupled to the media interface; and an electrical interface communicatively coupled to the circuitry and to a host device housing the pluggable module, wherein the circuitry stores a remapping table used to convert the code exchanged between the host device and the pluggable module. The remapping table converts the code from a first code supported by the pluggable module to a second code supported by the host device. For example, the host device does not support the first code. In an embodiment, the remapping table converts the code from a first code that is a vendor-specific code supported by the pluggable module to a second code that is standardized and supported by the host device. The remapping table can be updated via a management channel associated with the electrical interface. The remapping table can be deleted via a management channel associated with the electrical interface, and wherein, once deleted, the code is not remapped between the host device and the pluggable module.

The electrical interface can be defined by an electrical interface code, and wherein the electrical interface code is not remapped between the host device and the pluggable module. In an embodiment, the pluggable module includes a specific product code or serial number indicating the remapping table is stored in the circuitry. The remapping table can be stored in Non-volatile random-access memory (NVR) in the circuitry. In an embodiment, the remapping table is stored in the circuitry during manufacturing. In another embodiment, the remapping table is stored, modified, or updated in the circuitry after deployment via a management interface access. In a further embodiment, the circuitry includes a Digital Signal Processor (DSP), and wherein the media interface mode includes coherent modulation. The pluggable module can be a Quad Small Form-Factor Pluggable Double Density (QSFP-DD). In various embodiments, the pluggable module is managed by the host device via Common Management Interface Specification (CMIS). Also, in various embodiments, the code is defined in SFF-8024.

In another embodiment, a method of implemented in a pluggable module includes steps of, responsive to insertion of the pluggable module into a host device, advertising supported media interface modes by the pluggable module; receiving a code for one of the supported media interface modes; responsive to a remapping table stored in memory of the pluggable module, remapping the code to a different code for the pluggable module; and configuring a media interface based on the different code. The host device can support the code and does not support the different code, or the host device supports the code which is standard and does not support the different code which is a vendor-specific code. The steps can further include adding, deleting, or modifying the remapping table via a management channel associated with an electrical interface between the host device and the pluggable module, and wherein, once deleted, the code is not remapped between the host device and the pluggable module.

In a further embodiment, a host device includes a slot including an electrical interface configured to communicate with a pluggable module; and circuitry configured to interface with the pluggable module, communicate modes for operation with the pluggable module, wherein the modes include a media interface mode defined by a code, and interface data with the pluggable module for operation thereof where the pluggable module operates in the media interface mode and the host device is configured with a different code remapped from the code. The modes include an electrical interface mode defined by an electrical interface code, and wherein the electrical interface code is not remapped between the host device and the pluggable module.

BRIEF DESCRIPTION OF THE DRAWINGS

The present disclosure is detailed through various drawings, where like components or steps are indicated by identical reference numbers for clarity and consistency.

FIG. 1 illustrates a block diagram of a pluggable module illustrating functional components.

FIG. 2 illustrates a perspective diagram of an example pluggable module, namely a QSFP-DD module.

FIG. 3 illustrates an example operation of remapping between a pluggable module and host device.

FIG. 4 illustrates a process implemented in a pluggable module for remapping codes.

DETAILED DESCRIPTION OF THE DISCLOSURE

Again, the present disclosure relates to systems and methods for remapping reference codes in pluggable modules to support different applications.

Example Pluggable Module

FIG. 1 illustrates a block diagram of a pluggable module 10 illustrating functional components. FIG. 2 illustrates a perspective diagram of an example pluggable module 10, namely a QSFP-DD module. The pluggable module 10 is configured to plug into a host device 12 to provide connectivity thereto. The host device 12 include a wide range of networking and computing equipment such as routers, switches, and optical transport systems. For instance, high-capacity core routers in data centers often use QSFP-Double Density (QSFP-DD), Octal Small Form Factor Pluggable Modules (OSFP), or CFP2 pluggable modules to handle large volumes of data traffic across long distances. Network switches, particularly those in enterprise environments or data center top-of-rack configurations, commonly use SFP or QSFP modules for connecting to servers or other network devices via fiber optics. Additionally, Dense Wavelength Division Multiplexing (DWDM) systems, used in optical transport networks, frequently rely on pluggable transceivers like CFP2-Digital Coherent Optics (DCO), QSFP-DD, or OSFP modules to provide flexible, high-capacity optical links that can be easily upgraded or modified as network demands evolve. The pluggable module 10 includes a housing 14 that fits into a slot in the host device 12, ports 16 that receive connectorized cables, and an electrical interface 18 that connects to a corresponding interface (not shown) in the host device 12.

FIG. 1 illustrates functional aspects of the pluggable module 10, namely circuitry 20 that connects to the host device 12, via the electrical interface 18, and connects to a receiver 22 and a transmitter 24, each of the receiver 22 and the transmitter 24 connect optically or electrically to the connectorized cables that connect to the ports 16. The circuitry 20 can include a Digital Signal Processor (DSP) and other circuitry perform to perform various functions. The DSP handles advanced signal processing, including modulation, error correction, and compensation for optical impairments like chromatic and polarization mode dispersion. It also manages digital-to-analog and analog-to-digital conversion for transmitting and receiving signals. Additionally, the module's circuitry 20 includes power, management, thermal control, and communication interfaces with the host device 12, ensuring efficient operation and seamless integration within a network.

The transmitter 24, particularly in modules 10 using coherent modulation, converts electrical signals that the circuitry 20 receivers from the host device 12 into complex optical signals for transmission over fiber optic cables. It includes a laser diode, which generates the light signal, and an advanced external modulator that encodes data using sophisticated modulation formats like QPSK (Quadrature Phase Shift Keying), 16-QAM (Quadrature Amplitude Modulation), or other complex modulations. These formats allow for the transmission of multiple bits per symbol, significantly increasing the data capacity of the link. In coherent systems, the transmitter 24 may also include components like an optical amplifier to boost the signal for long-distance transmission.

The receiver 22 uses advanced techniques to convert incoming complex optical signals back into electrical signals for the circuitry 20 to provide to the host device. It employs a coherent detector, which, along with a local oscillator laser, mixes the incoming signal with a reference signal to extract both amplitude and phase information. This signal is then processed by a photodetector array and amplified by a transimpedance amplifier (TIA). The module's DSP plays a crucial role in demodulating the signal, compensating for impairments like chromatic and polarization mode dispersion, and performing error correction. The combination of these technologies allows for highly sensitive detection and efficient transmission over long distances, making coherent modulation ideal for high-capacity, long-haul, and metro optical networks. Of course, other formats are also contemplated besides coherent modulation.

Some examples of pluggable modules include:

(1) SFP (Small Form-Factor Pluggable): Commonly used for both Ethernet and Fibre Channel applications, supporting speeds up to 4.25 Gbps. SFP modules are widely used in network switches and routers for short- to medium-distance fiber optic connections.

(2) SFP+ (Enhanced Small Form-Factor Pluggable): An evolution of SFP, supporting higher data rates up to 10 Gbps, commonly used in 10 Gigabit Ethernet networks.

(3) QSFP (Quad Small Form-Factor Pluggable): Supports four channels of data, typically used for 40 Gigabit Ethernet. Variants like QSFP+ support up to 100 Gbps, making them popular in data centers for high-speed interconnects.

(4) QSFP-DD (Quad Small Form-Factor Pluggable Double Density): An advanced version of QSFP, supporting data rates up to 400 Gbps, used in high-performance computing, large-scale data centers, and telecom applications.

(5) CFP (C Form-Factor Pluggable): Designed for 100 Gbps Ethernet and OTU4 (Optical Transport Network) applications, often used in long-haul and metro networks.

(6) CFP2-DCO (C Form-Factor Pluggable 2—Digital Coherent Optics): A more compact version of CFP with integrated coherent optics, used in high-capacity long-haul and metro networks, supporting data rates up to 400 Gbps.

(7) XFP (10 Gigabit Small Form-Factor Pluggable): Used for 10 Gbps applications, including 10 Gigabit Ethernet, Fibre Channel, and SONET/SDH networks.

(8) OSFP (Octal Small Form-Factor Pluggable): Supports 400 Gbps Ethernet, designed for high-speed data center interconnects, and competes with QSFP-DD in the 400 Gbps space.

Those skilled in the art will appreciate these are merely examples and the present disclosure contemplates use with any type of pluggable module 10.

Pluggable modules offer flexibility in feature support and enhance multi-vendor interoperability in networking environments. They allow easy upgrades or modifications to network capabilities, such as increasing data rates or changing wavelengths, without needing to replace entire devices. Built to industry standards, these modules ensure compatibility across different manufacturers, enabling network operators to source components from multiple vendors, reducing costs, and avoiding vendor lock-in. This modular approach promotes scalability, adaptability, and cost efficiency, while supporting a diverse and competitive market for network technologies.

An advantage of the pluggable module approach is there can be a separate vendor for the pluggable module 10 from the host device 12. However, this requires standardization such as via Multisource Agreements (MSA) so any pluggable module 10 that supports a given specification can work in a corresponding host device 12 that also supports that specification.

Management of Pluggable Modules

Example standards for management of pluggable modules include CMIS, described in the Optical Internetworking Forum (OIF) Implementation Agreement (IA), Common Management Interface Specification (CMIS), Revision 5.2, OIF-CMIS-05.2, Apr. 27, 2022, and the Storage Networking Industry Association (SNIA), Small Form-Factor (SFF) Specification SFF-8024, SFF Module Management Reference Code Tables, Rev. 4.12, Jul. 9, 2024, the contents of each are incorporated by reference in their entirety. Other standards include CFP MSA Hardware Specification, Rev. 1.4, published by the CFP MSA organization, Jul. 7, 2010, and SFF-8636, Specification for Management Interface for 4-lane Modules, Revision 2.11, Jan. 3, 2023, the contents of each are incorporated by reference in their entirety. Those skilled in the art will recognize there are various other specifications, standards, Multisource Agreements, etc., all of which are contemplated with the approach described herein.

CMIS and SFF-8024 (Management Interface for SFP-DD, QSFP-DD, and OSFP) enable effective management and interoperability between pluggable modules 10 and host devices 12. CMIS defines the communication protocol that allows the host device 12 to initialize, configure, monitor, and control the module 10. It ensures consistent management across different platforms and vendors by providing standardized procedures for tasks such as setting operational parameters, monitoring real-time performance metrics, and reporting errors. This standardization simplifies network management and troubleshooting, particularly in multi-vendor environments.

SFF-8024 complements CMIS by specifying the electrical, optical, and physical interface details for certain types of pluggable modules 10, including SFP-DD, QSFP-DD, and OSFP. It provides identifiers that allow advertising the capabilities of optical and electrical modules. SFF-8024 defines how modules report their capabilities and supported applications to the host device, ensuring compatibility and facilitating accurate inventory management.

Pluggable modules managed by CMIS and other SFF approaches use standardized Media and Host identifiers to define the interfaces. SFF-8024 defines the SFF Module Management Reference Codes. This specification provides codes for module identifiers, encoding values, connector types, extended compliance codes, host electrical interface, and module media interfaces. These codes are used to advertise module capabilities in a memory map, e.g., in the circuitry 20 of the module 10. In SFF-8024, the host electrical interface refers to the physical and electrical connections between the host device 12 and the pluggable module 10. This interface ensures that the electrical signals are properly transmitted between the host device 12 and the module 10, enabling data communication and control signals to flow seamlessly. It includes specifications for signal integrity, voltage levels, and pin assignments to ensure compatibility across different vendors'equipment. Of course, the host device 12 and the pluggable module 10 must both support a given electrical interface, as specified by the host identifier.

On the other hand, the module media interface pertains to the connection between the pluggable module 10 and the external transmission medium, such as optical fiber or copper cabling. This interface defines how the module 10 converts electrical signals from the host into the appropriate format for transmission over the network media, whether that involves optical signals for fiber or electrical signals for copper. Together, these interfaces ensure that the pluggable module 10 can effectively bridge the host device 12 with the external network, maintaining high performance and reliability. Of note, because the media interface is optical between two modules 10, the host device 12 does not necessarily need to support a given code for the module media interface.

Vendor-specific codes for the module media interface in pluggable modules 10 are used to implement unique features or functionalities that go beyond standard specifications defined by industry standards like SFF-8024, Table 4-7 SMF media interface IDs. These codes allow module manufacturers to offer enhanced capabilities or optimizations tailored to specific customer needs or applications. For example, a vendor might use specific codes to support proprietary modulation formats, advanced error correction techniques, or specialized signal processing algorithms that are not covered by standard protocols. These vendor-specific codes enable differentiation in a competitive market, allowing vendors to offer modules 10 with unique performance characteristics, improved efficiency, or additional diagnostic features.

However, because these vendor-specific codes are not standardized, they may require specialized software or firmware on the host device to fully utilize the module's capabilities. This can lead to challenges in multi-vendor environments, where interoperability is crucial. Having vendor-specific codes for proprietary applications supported in legacy host devices 12 has been a continuing problem; host devices 12 interrogate modules 10 after insertion and will only activate known applications corresponding to recognized identifier codes. In some cases, the host device 12 will actively block any unknown codes to attempt to limit the use of competitive modules. Some host device 12 vendors may want to avoid support for vendor-specific codes, such as to encourage network operators to sole source the modules 10 from them. In other cases, host devices 10 will have certain custom codes recognized, but these codes may not map to the same applications in another vendor's modules 10.

In order for a module 10 to function in a host device 12, the host device 12 must recognize the host code, and configure its electrical interface to match the pluggable module 10's code. However, in many cases a host device 12 could be capable of activating a proprietary optical (media side) application, but the host device 12 software is not written to allow provisioning of custom applications.

This has posed an issue to deploy custom applications. In an example, a standard SMF media interface ID code of 3Eh exists for 400ZR (Application Codes 0x01 and 0x03), DWDM, amplified. However, the pluggable module 10 could include a higher-performance optical interface, such as a 400G QSFP-DD running at a higher baud than the 400ZR code of 3Eh.

Also, since the development is independent, module vendors may introduce advanced features via vendor-specific codes faster than host device 12 vendors can update their software to support these features. New modes for media interfaces are being introduced in the CMIS based coherent pluggable module space consistently. These modes could either be standard or vendor-specific codes, i.e., proprietary ones offered by a vendor. The modules 10 supporting these new modes are expected to work in existing host devices 12 in the field. The software running on these platforms may not have knowledge of these new media interfaces, and the end user of the host device 12 may not wish to change/update a stable running software baseline. However, the end user may also wish to exercise the new modes offered by the modules 10.

There is a need for a simple mechanism to unlock the use of these modes without having to churn the software on host devices 12. The mechanism also needs to be flexible such that it can work on any host device 12.

In order to address this issue of host device 12 support for vendor-specific codes, the present disclosure includes a remapping approach where the pluggable module 10 advertises codes for standard applications (e.g., 3Eh for 400ZR) with the host device 12, while remapping these codes for standard applications to vendor-specific codes for custom applications. This can also include remapping codes for standard applications into codes for other standard applications that are not recognized by the host device 12, or mapping vendor-specific codes for proprietary applications programmed on the host device 12 into codes for other proprietary or standard applications on the module 10.

The circuitry 20 includes a memory map that has a mapping of codes from the host device 12 to codes for the pluggable module 10. For example, assume the pluggable module 10 supports an advanced application with vendor-specific code C0h, which is not supported by the host device 12. Further, assume the host device 12 supports 3Eh for 400ZR, then the memory map can have a mapping of 3Eh with the host device 12 means C0h to the pluggable module 10. This feature can be programmably enabled, i.e., the remapping is turned on or off. When off, the codes with the host device 12 are passed through directly, and, when on, there is a remapping based on the memory map. In another embodiment, the ability to support the remapping can be programmed at manufacturing. For example, modules 10 can have different product codes which indicate remapping ability or not.

Again, applications (e.g., 400ZR DWDM) supported by CMIS-based modules 10 contain the media identifiers (codes), and the media interface is defined by identifiers—Either standard codes from SFF8024 or custom codes, such as vendor-specific codes. The list of supported applications is advertised by the module 10, and will correspond to host-recognized codes. Generally, a host device 12 can cycle through the list and pick an application that it recognizes.

To enable host device 12 support for non-recognized codes, the present disclosure remaps the advertised identifier into another desired media mode. To exercise the desired media mode, the media interface ID corresponding to the selected application needs to be remapped to desired target ID. The necessary remapping can be defined by a simple table in the memory map of the circuitry 20 with pairs of programmed media ID (interface ID that will be remapped) and target media ID. The table can be read and modified by the host device 12 via simple, direct I2C accesses The pluggable module 10 can save the remapping table to Non-volatile random-access memory (NVR) space once it has been written, such that it can survive resets and Power on Resets (PORs). The module 10 will reference the table for the desired target media ID during data path or network path initialization. Basically, in the remapping configuration, the host device 12 uses a known code and the module 10 knows to change this known code to another code, based on a predefined map. Those skilled in the are will recognize the remapping table can be any code or data structure used to map between codes, i.e., it does not necessarily need to be in tabular form. For example, the remapping table can be a series of if . . . then commands, a look up table, etc.

The remapping table essentially defines a relationship between the advertised identifier and what identifier the advertised identifier maps to. In most use cases the advertised identifier is standards compliant, but in cases where a supplier uses a custom identifier in advertising this can also be matched and remapped to a different code. Modules do advertise standard and custom codes for a variety of reasons; with custom codes used to advertise proprietary modes, pre-standard modes, or sometimes standard modes as implemented in host software.

The pluggable module 10 is responsible for:
(1) Loading the stored content within 2 s of the module boot to meet CMIS specifications.
(2) Policing when the media ID can be remapped.
(3) Validating the target media ID.
(4) Applying the configuration associated with the target media ID
(5) Providing support to revert the content to original values.

In an embodiment, in the absence of a remapping table, module defaults to normal operation. Thus, the remapping functionality can be turned on/off by loading the remapping table into memory in the circuitry 20, i.e., no remapping table, then normal operation, and whenever there is a remapping table, use this to change codes between the host device 12 and the module 10. In another embodiment, the remapping table functionality can be enabled/disable based on a configuration via I2C. In a further embodiment, the remapping table can be determined based on a product code of the module 10.

This allows integration of new and custom media modes in existing host devices 10 without requiring host software to have explicit knowledge of the actual modes being run.

FIG. 3 illustrates an example operation of remapping between a pluggable module 10 and host device 12. In this example, the host device 12 and the pluggable module 10 use a host interface of 400GE|400GAUI-4. The host device 12 provisions the media interface per following SFF-8024, using the code 3Eh for the media interface. The pluggable module 10 has a remapping table configured therein which remaps the code 3Eh to a vendor-specific code C0h, all without the host device 12.

SFF-8024 and CMIS

Those skilled in the art will appreciate the present disclosure uses the codes in SFF-8024 and CMIS as examples. The techniques described herein to remap codes contemplates use with other standards and is not limited to the codes in SFF-8024. Further, the present disclosure contemplates any pluggable modules as well as management with other techniques besides CMIS.

Pluggable Module with a Remapping Table

In an embodiment, a pluggable module 10 includes a media interface including a receiver 22 and a transmitter 24, wherein the media interface is configured to operate a media interface mode defined by a code; circuitry 20 communicatively coupled to the media interface; and an electrical interface 18 communicatively coupled to the circuitry 20 and to a host device 12 housing the pluggable module 10, wherein the circuitry 20 stores a remapping table that converts the code between the host device 12 and the pluggable module 10, such as for programming the pluggable module 10 by the host device 12, for advertising capabilities by the pluggable module 10 to the host device 12, etc. Note, the media interface can be an optical, i.e., fiber optic where the media includes optical signals, as well as an electrical., i.e., some form of active electric cable where the media includes electrical signals.

In an embodiment, the remapping table converts the code from a first code supported by the pluggable module 10 to a second code supported by the host device 12. In another embodiment, the remapping table converts the code from a first code supported by the pluggable to a second code supported by the host device, and wherein the host device does not support the first code. In a further embodiment, the remapping table converts the code from a first code that is a vendor-specific code supported by the pluggable module 10 to a second code that is standardized and supported by the host device 12.

In an embodiment, the remapping table is configured to be updated via a management channel associated with the electrical interface. The remapping table can be configured to be deleted via a management channel associated with the electrical interface, and wherein, once deleted, the code is not remapped between the host device and the pluggable module. The electrical interface is defined by an electrical interface code, and wherein the electrical interface code is not remapped between the host device and the pluggable module.

In an embodiment, the pluggable module includes a specific product code or serial number indicating the presence of the remapping table. The remapping table is stored in Non-volatile random-access memory (NVR) in the circuitry. In an embodiment, the remapping table is stored in the circuitry during manufacturing. In another embodiment, the remapping table is stored, modified, or updated in the circuitry after deployment via direct Inter-Integrated Circuit (I2C) access.

The circuitry can include a Digital Signal Processor (DSP), and wherein the media interface mode includes coherent modulation. In an embodiment, the pluggable module is Quad Small Form-Factor Pluggable Double Density (QSFP-DD). In another embodiment, the pluggable module is managed by the host device via Common Management Interface Specification (CMIS). In a further embodiment, the code is defined in SFF-8024.

Process

FIG. 4 illustrates a process 50 implemented in a pluggable module 10 for remapping codes. The process 50 includes, responsive to insertion of the pluggable module into a host device, advertising supported media interface modes by the pluggable module (step 52); receiving a code for one of the supported media interface modes (step 54); responsive to a remapping table stored in memory of the pluggable module, remapping the code to a different code for the pluggable module (step 56); and configuring a media interface based on the different code (step 58).

In an embodiment, the host device supports the code and does not support the different code. In another embodiment, the host device supports the code which is standard and does not support the different code which is a vendor-specific code.

The process 50 can include adding, deleting, or modifying the remapping table via a management channel associated with an electrical interface between the host device and the pluggable module, and wherein, once deleted, the code is not remapped between the host device and the pluggable module. The process 50 can include adding, deleting, or modifying the remapping table either during manufacturing or after deployment via a management channel.

Of note, the terms codes and identifiers are used similarly herein, namely some value to represent some mode or application. Also, the terms modes and application are also similar, referring to a specific configuration and identified by the code or identifier. Also, the remapping table and the associated functionality is described happening in or at the pluggable module 10 for illustration purposes. Those skilled in the art will appreciate the remapping of the identifier or code could be performed by the host device, via some external software or component between the pluggable module 10 and the host device, etc.

Processing Circuitry and Non-Transitory Computer-Readable Mediums

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); Programmable Logic Device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

Conclusion

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of: only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown or described in the drawings, descriptions, and claims in a specific order, this does not imply they must be performed in that sequence unless explicitly stated. It also does not imply that all depicted operations are necessary to achieve desirable results. In the drawings, descriptions, and claims, extra steps can occur before, after, simultaneously with, or between any of the illustrated, described, or claimed steps. Multitasking, parallel processing, and other types of concurrent processing are also contemplated. Furthermore, the separation of system components or steps described should not be interpreted as mandatory for all implementations;

also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable manner—whether collectively, in subsets, or individually—thereby broadening the range of potential embodiments.

What is claimed is:

1. A pluggable module comprising:
   a media interface including a receiver and a transmitter, wherein the media interface is configured to operate a media interface mode defined by a code;
   circuitry communicatively coupled to the media interface; and
   an electrical interface communicatively coupled to the circuitry and to a host device housing the pluggable module,
   wherein the circuitry stores, in a memory map of the pluggable module, a remapping table that is used to convert the code exchanged between the host device and the pluggable module, and that defines pairs of a programmed media interface identifier received from the host device and a target media interface identifier used internally by the pluggable module, and
   wherein, responsive to receipt of the programmed media interface identifier from the host device via the electrical interface, the circuitry remaps the programmed media interface identifier to the target media interface identifier and configures the media interface based on the target media interface identifier.

2. The pluggable module of claim 1, wherein the remapping table converts the code from a first code supported by the pluggable module to a second code supported by the host device,
   wherein the second code is a standard media interface identifier recognized by the host device and the first code is a vendor-specific or custom media interface identifier not supported by the host device, and wherein the host device provisions the second code while the pluggable module operates using the first code.

3. The pluggable module of claim 1, wherein the remapping table converts the code from a first code that is a vendor-specific code supported by the pluggable module to a second code that is standardized and supported by the host device.

4. The pluggable module of claim 1, wherein the remapping table is configured to be updated via a management channel associated with the electrical interface.

5. The pluggable module of claim 1, wherein the remapping table is configured to be deleted via a management channel associated with the electrical interface, and wherein, once deleted, the code is not remapped between the host device and the pluggable module.

6. The pluggable module of claim 1, wherein the electrical interface is defined by an electrical interface code, and wherein the electrical interface code is not remapped between the host device and the pluggable module.

7. The pluggable module of claim 1, wherein the pluggable module includes a specific product code or serial number indicating the remapping table is stored in the circuitry.

8. The pluggable module of claim 1, wherein the remapping table is stored in Non-volatile random-access memory (NVR) in the circuitry.

9. The pluggable module of claim 1, wherein the remapping table is stored in the circuitry during manufacturing.

10. The pluggable module of claim 1, wherein the remapping table is stored, modified, or updated in the circuitry after deployment via a management interface access.

11. The pluggable module of claim 1, wherein the circuitry includes a Digital Signal Processor (DSP), and wherein the media interface mode includes coherent modulation.

12. The pluggable module of claim 1, wherein the pluggable module is Quad Small Form-Factor Pluggable Double Density (QSFP-DD).

13. The pluggable module of claim 1, wherein the pluggable module is managed by the host device via Common Management Interface Specification (CMIS).

14. The pluggable module of claim 1, wherein the code is defined in SFF-8024.

15. A method of implemented in a pluggable module, the method comprising steps of:

responsive to insertion of the pluggable module into a host device, advertising supported media interface modes by the pluggable module;

receiving a code for one of the supported media interface modes;

responsive to a remapping table stored in memory of the pluggable module, remapping the code to a different code for the pluggable module; and configuring a media interface based on the different code, wherein the remapping table is stored in a memory map of circuitry of the pluggable module that defines pairs of (i) a programmed media interface identifier received from the host device via an electrical interface and (ii) a target media interface identifier used internally by the pluggable module, and wherein the remapping comprises, responsive to receipt of the programmed media interface identifier from the host device, translating the programmed media interface identifier to the target media interface identifier and configuring the media interface based on the target media interface identifier.

16. The method of claim 15, wherein one of the host device supports the code and does not support the different code, or the host device supports the code which is standard and does not support the different code which is a vendor-specific code.

17. The method of claim 15, wherein the steps further include adding, deleting, or modifying the remapping table via a management channel associated with an electrical interface between the host device and the pluggable module, and wherein, once deleted, the code is not remapped between the host device and the pluggable module.

18. A host device comprising:

a slot including an electrical interface configured to communicate with a pluggable module; and circuitry configured to interface with the pluggable module, communicate modes for operation with the pluggable module, wherein the modes include a media interface mode defined by a code, and interface data with the pluggable module for operation thereof where the pluggable module operates in the media interface mode and the host device is configured with a different code remapped from the code, wherein the different code is a programmed media interface identifier recognized by the host device and communicated by the host device to the pluggable module via the electrical interface, wherein the pluggable module stores, in a memory map of circuitry of the pluggable module, a remapping table defining pairs of the programmed media interface identifier and a target media interface identifier used internally by the pluggable module, and wherein the host device remains configured with the programmed media interface identifier while the pluggable module operates using the target media interface identifier obtained by remapping the programmed media interface identifier.

19. The host device of claim 18, wherein the modes include an electrical interface mode defined by an electrical interface code, and wherein the electrical interface code is not remapped between the host device and the pluggable module.

* * * * *